(12) United States Patent
Jeffries et al.

(10) Patent No.: US 7,280,477 B2
(45) Date of Patent: Oct. 9, 2007

(54) TOKEN-BASED ACTIVE QUEUE MANAGEMENT

(75) Inventors: Clark D. Jeffries, Durham, NC (US); Andreas Kind, Kilchberg (CH); Bernard Metzler, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1081 days.

(21) Appl. No.: 10/259,153

(22) Filed: Sep. 27, 2002

(65) Prior Publication Data

US 2004/0062259 A1    Apr. 1, 2004

(51) Int. Cl.
*H04L 12/28* (2006.01)

(52) U.S. Cl. .................. 370/235; 370/252; 370/412

(58) Field of Classification Search ............ 370/412, 370/235, 229, 230, 252, 417, 419, 477
See application file for complete search history.

(56) References Cited

U.S. PATENT DOCUMENTS

| | | | |
|---|---|---|---|
| 5,943,316 A * | 8/1999 | Davis .................... 370/232 |
| 6,356,565 B1 * | 3/2002 | Bouyer et al. ............ 370/468 |
| 6,681,283 B1 * | 1/2004 | Thekkath et al. ........... 710/305 |
| 6,940,818 B2 * | 9/2005 | Moran et al. ............ 370/235.1 |
| 7,002,980 B1 * | 2/2006 | Brewer et al. ............. 370/414 |
| 7,020,143 B2 * | 3/2006 | Zdan ...................... 370/395.21 |
| 2002/0071387 A1 * | 6/2002 | Horiguchi et al. .......... 370/229 |

* cited by examiner

*Primary Examiner*—Min Jung
(74) *Attorney, Agent, or Firm*—Scully, Scott, Murphy & Presser, P.C.; Douglas W. Cameron Esq.

(57) ABSTRACT

Methods and apparatus are provided for managing a data packet queue corresponding to a resource of a network device. A token count $T_C$ is maintained for a predefined flow of data packets, and the transmission of packets in the flow into the queue is controlled in dependence on this token count. The token count is decremented when packets in the flow are transmitted into the queue, and the token count is incremented at a token increment rate C. A bandwidth indicator, indicative of bandwidth availability in the resource, is monitored, and the token increment rate C is varied in dependence on this bandwidth indicator. The bandwidth-dependent variation of the token increment rate C is such that, when available bandwidth is indicated, the increment rate C is increased, and when no available bandwidth is indicated the increment rate C is decreased.

18 Claims, 4 Drawing Sheets

TOKEN-BASED ACTIVE QUEUE MANAGEMENT

TECHNICAL FIELD

This invention relates generally to token-based active queue management systems for managing queues of data packets in network devices.

BACKGROUND OF THE INVENTION

Active queue management systems are employed for controlling congestion in network devices. In any communications network, data packets received by network devices must be processed in some way. As incoming packet rates vary in a given network device, if any resource involved in the processing of data packets receives packets at a higher rate than it can process the packets, then packets will back up, effectively giving rise to a queue of data packets. Congestion occurs when resources are overloaded and the number of packets queued becomes excessive. As a simple example, network routers have a finite amount of buffer space for queuing packets awaiting transmission over outgoing links. If the incoming packet rate is too high so that resources are overloaded, queue lengths can increase to the point where router buffers are full. Network delay is also a key issue, and excessive queue lengths can give rise to unacceptable delays to network traffic.

Active queue management techniques address such problems by managing data packet queues in accordance with congestion levels with a view to avoiding adverse conditions. With token-based techniques (for example as described in Internet Engineering Task Force Request for Comments (IETF RFC) No. 2697 "A Single Rate Three Color Marker", September 1999, and IETF RFC No. 2698 "A Two Rate Three Color Marker", September 1999), a token counter, or "token bucket", is associated with a queue. More particularly, a token bucket is associated with a flow of data packets to be enqueued, where a "flow" is some defined set or category of data packets, such as packets from a particular group of sources, or packets requiring a particular class of service for example. Each token represents a defined unit of data, such as a bit or byte. Tokens are continuously added to the bucket (the token count is incremented), and tokens are removed from the bucket (the token count is decremented) when packets are transmitted into the queue. More specifically, the token count is incremented at a constant rate known as the Committed Information Rate (CIR), up to a maximum upper limit on the token count known as the Committed Burst Size (CBS). At the arrival of a packet, the token count is decremented by a number of tokens corresponding to the packet size and the packet is enqueued. However, if there are insufficient tokens in the bucket, i.e. the token count is less than the packet size measured in tokens, then no decrement is made and the packet is dropped (discarded), or marked to be dropped at a later stage if necessary. In this way, queues are controlled in accordance with the availability of tokens, and excessive queue lengths can be avoided.

Active queue management systems may employ some form of feedback in the queue control mechanism based on available bandwidth in the resource to be protected. In particular, feedback based on queue occupancy is employed in some systems, since the length of a queue provides a direct measure of use of the corresponding resource and is thus a convenient indicator of bandwidth availability. For example, International Patent Application WO 02/07381 A2, published 24, Jan. 2002, discloses a domain based congestion management system in which a token bucket scheme is implemented by ingress nodes at the edge of a network domain. Bandwidth feedback is employed here in that, when a packet is enqueued, the token count is decremented by a number of tokens that varies depending on average queue length. Specifically, the number of tokens "consumed" by a packet is obtained by multiplying the packet size by a weighting factor dependent on average queue length. The weighting factor here also depends on the presence or absence of a "congestion notification" generated by core nodes in the domain based on the state of their local queues. Congestion notifications are generated by core nodes using a queue-length thresholding technique based on a modified form of the RED (Random Early Detection) system. RED is an active queue management technique wherein an average queue length is compared with a minimum and a maximum threshold. For average queue lengths above the maximum threshold all packets are dropped. For average queue lengths between the two thresholds packets are randomly transmitted into the queue with a transmit probability dependent on the average queue length. Development of the RED algorithm has given rise to further active queue management systems. For example, a scheme with a single average queue length but multiple sets of queue thresholds and maximum probabilities is known as WRED (Weighted RED). Here, the queue thresholds can be set to be fully overlapped, partially overlapped or staggered. RED with separate average queues for respective "colors" (which are used to mark packets according to some defined marking policy), and corresponding sets of minimum/maximum queue thresholds and maximum probabilities is known as RIO (RED with in/out queues). With RIO the contribution of packets to a particular color in the current total queue level can be addressed with an individual set of parameters, whereas WRED operates only on total queue size. In this respect RIO is better suited to protect lower drop precedence flows against higher drop precedence flows.

Common to all the above systems employing bandwidth feedback is that the feedback signal is based on average queue length, and this is then used directly to determine packet drop rates. While average queue length provides a useful indication of congestion status, using this directly to determine drop rates makes it difficult for network administrators to determine the correct parameter settings for operation of real networks. For example, finding the correct parameter settings where different groups of network users are offered different service levels, and for any combination of offered loads, is problematical. Moreover, in the above systems, feedback-dependent decisions on whether to transmit packets into a queue are made on a per-packet basis, requiring a significant amount of complex computation for each packet. Accordingly, it would be desirable to provide an active queue management system which alleviates some or all of the disadvantages with the above systems.

SUMMARY OF THE INVENTION

It is accordingly an object of the present invention to provide a method for managing a data packet queue corresponding to a resource of a network device.

It is a further object of the present invention to provide a token-based active queue management system and method for managing a data packet queue corresponding to a resource of a network device which provides a bandwidth feedback mechanism for incrementing a token rate depending upon available network bandwidth.

According to this aspect of the invention, there is provided a token-based active queue management scheme in which the token increment rate is not constant, as in prior systems, but is varied in dependence on bandwidth feedback provided by way of the bandwidth indicator.

Thus, according to the invention, there is provided a system and method for managing a data packet queue corresponding to a resource of a network device, the method comprising the steps of:

maintaining a token count for a predefined flow of data packets;

controlling transmission of packets in said flow into the queue in dependence on the token count;

decrementing the token count when packets in the flow are transmitted into the queue;

incrementing the token count at a token increment rate;

monitoring a bandwidth indicator indicative of bandwidth availability in the network resource; and varying the token increment rate in dependence on the bandwidth indicator such that the increment rate is increased when available bandwidth is indicated and decreased when no available bandwidth is indicated.

Thus, in accordance with a first embodiment of the present invention, there is provided a token-based active queue management scheme in which the token increment rate is not constant, as in prior systems, but is varied in dependence on bandwidth feedback provided by way of the bandwidth indicator. The token increment rate is increased or decreased according to whether available bandwidth is indicated or not. This bandwidth-dependent variation of the increment rate provides a particularly simple yet effective bandwidth feedback mechanism, ensuring the system is responsive to congestion status while significantly simplifying implementation as compared with prior systems. The use of a token-based scheme has the effect of smoothing bandwith availability information. Therefore bandwidth-dependent decisions using instantaneous bandwidth availability knowledge need not be made on a per-packet basis, allowing simplification of the processing required for individual packets. Moreover, varying the increment rate in dependence on bandwidth availability allows the operation of systems embodying the invention to be more reliably predictable, facilitating the selection of correct parameter settings for efficient network operation. Overall, therefore, embodiments of the invention provide active queue management schemes which significantly alleviate problems of prior systems as discussed above.

The token count is associated with a particular flow of data packets, where the flow may comprise any defined category of data packets as described above, and may itself be an aggregated flow representing more than one individually-defined packet flow. In general, one or more flows of data packets may be processed by the same resource and hence share the same queue, and a separate token counter, maintained as described above, may be provided for each flow. This allows different parameter settings to be used in different token bucket systems to accommodate, for example, different offered service levels as discussed further below.

As will be appreciated by those skilled in the art, the queue itself may be a real queue (e.g. a sequence of data packets in a buffer memory), but may also be a logical queue associated with the resource, where the logical queue represents a logical abstraction of the operation of the resource in question. Thus the queue may or may not map to a single piece of memory. Equally, the resource to which the queue corresponds may be, for example, a single memory item such as a buffer, or multiple memory items such as a set of buffers, or simply control logic for processing packets in some way, the operation of which can be abstracted as a logical queue. In general, therefore, the resource in question may be any device resource for which the packet handling throughput can be represented, whether directly or by logical abstraction, as a queue.

In a further embodiment, the token increment rate is varied at periodic time intervals in dependence on the bandwidth indicator. Here, the increment rate is periodically increased or decreased according to whether or not available bandwidth is indicated. Thus, if available bandwidth persists over successive time intervals, the increment rate will be progressively increased. Equally, in the absence of available bandwidth over successive time intervals the increment rate will be progressively decreased. In preferred embodiments, the increment rate can only be varied between predefined minimum and maximum rates. These limiting rates can be conveniently set based on the quality of service to be afforded to the flow, and can be different for different flows sharing the queue, so that different network users can be offered different levels of service for example. In addition, to avoid potential instability in the system, the rate of increase in the increment rate is preferably constrained to be less than the rate of decrease, i.e. the increment rate can fall faster than it can rise. Thus, in preferred embodiments the increment rate is increased linearly at successive time intervals while bandwidth availability persists, and decreased multiplicatively (i.e. exponentially) at successive intervals in the absence of available bandwidth. This provides a reliably stable system, and the linear/multiplicative factors used for the linear increase/multiplicative decrease of the increment rate can be conveniently set to give the desired responsiveness of the system and ensure fair sharing of bandwidth between multiple flows.

The bandwidth indicator monitored in embodiments of the invention provides some form of indication of bandwidth availability in the resource, whereby it may be determined from this indicator whether or not there is available (i.e., excess or spare) bandwidth. In general, bandwidth availability in the resource might be assessed in a variety of ways, for example based on overall input versus output rates or indeed any other measure of use of the resource. However, since queue occupancy provides a convenient measure of bandwidth availability, the bandwidth indicator in one embodiment of the invention may be dependent on occupancy of the queue. In particularly preferred embodiments, the bandwidth indicator may be a simple flag, or two-state indicator, signifying either bandwidth available or no bandwidth available, which is generated by comparing the queue occupancy with one or more thresholds as described further below.

The transmission of packets into the queue is controlled in dependence on the token count. In some embodiments, this control process may involve either enqueuing or dropping each packet in dependence on the token count. In other embodiments, instead of dropping packets, the control process may involve marking packets for preferential dropping at a later stage. In either case, the decision for a given packet is preferably made by simply comparing the packet size with the token count to determine if sufficient tokens are available. If so, the token count is decremented by the packet size (in tokens) and the packet is enqueued. Other factors may be incorporated in the decision here if desired, but this process, coupled with the feedback-dependent variation of the increment rate, provides a particularly simple and efficient system. If insufficient tokens are available, then the packet is dropped or, where marking is employed, marked to be dropped. In the latter case, the packet is enqueued without decrementing the token count. In these embodiments therefore, the token count is not decremented for all packets which are enqueued, but only the unmarked packets.

A second aspect of the invention provides an apparatus for managing a data packet queue corresponding to a resource of a network device. The apparatus comprises a token counter corresponding to a predefined flow of data packets, and control logic configured to: control transmission of packets in said flow into the queue in dependence on the token count; decrement the token count when packets in the flow are transmitted into the queue; increment the token count at a token increment rate; monitor a bandwidth indicator indicative of bandwidth availability in the resource; and vary the token increment rate in dependence on the bandwidth indicator such that the increment rate is increased when available bandwidth is indicated and decreased when no available bandwidth is indicated.

Another aspect of the invention provides a network device for processing data packets in a communications network, the device comprising a resource associated with a queue of data packets, and an apparatus for managing the data packet queue in accordance with the bandwidth-feedback mechanism as described herein. Another aspect of the invention provides a data communications network including one or more such devices. A further aspect of the invention provides a computer program product for causing a processor of a network device to perform a queue management method as herein described.

In general, it is to be understood that, where features are described herein with reference to a method embodying the invention, corresponding features may be provided in accordance with apparatus embodying the invention, and vice versa.

BRIEF DESCRIPTION OF THE DRAWINGS

Preferred embodiments of the invention will now be described, by way of illustrative and non-limiting example, with reference to the accompanying drawings in which.

DESCRIPTION OF PREFERRED EMBODIMENTS

Figure 1:
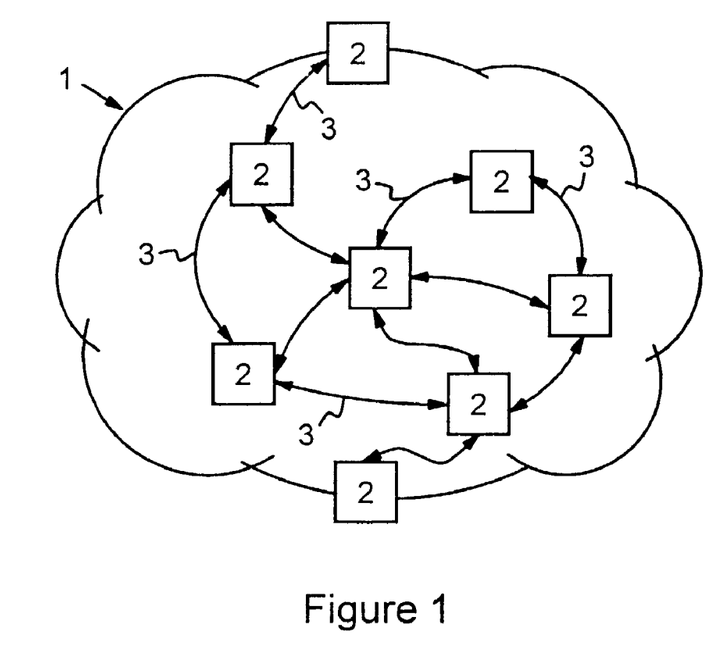
FIG. 1 is a representation of a data communications network.

FIG. 1 illustrates an example communications network 1 comprising a plurality of network devices, here routers 2, interconnected by links 3. The network 1 may form part of a larger network or internetwork, such as the Internet, or may itself represent such an internetwork. In any case, routers at the edge of network 1 typically have external links (not shown) to devices outside the network. Two such edge routers are shown in this example. The remaining six routers are core routers and have direct links only with other routers in the network.

The stability of network 1 depends on the use of congestion avoidance mechanisms in routers 2. Such mechanisms are ideally employed in both edge routers and core routers within the network. For responsive flows such as TCP (Transport Control Protocol) flows, the end-to-end congestion control mechanism provided by the network protocol is typically combined with an active queue management system for local congestion management. A preferred embodiment of an active queue management system according to the invention which may be employed in routers 2 will now be described with reference to FIGS. 2 to 5.

Figure 2:
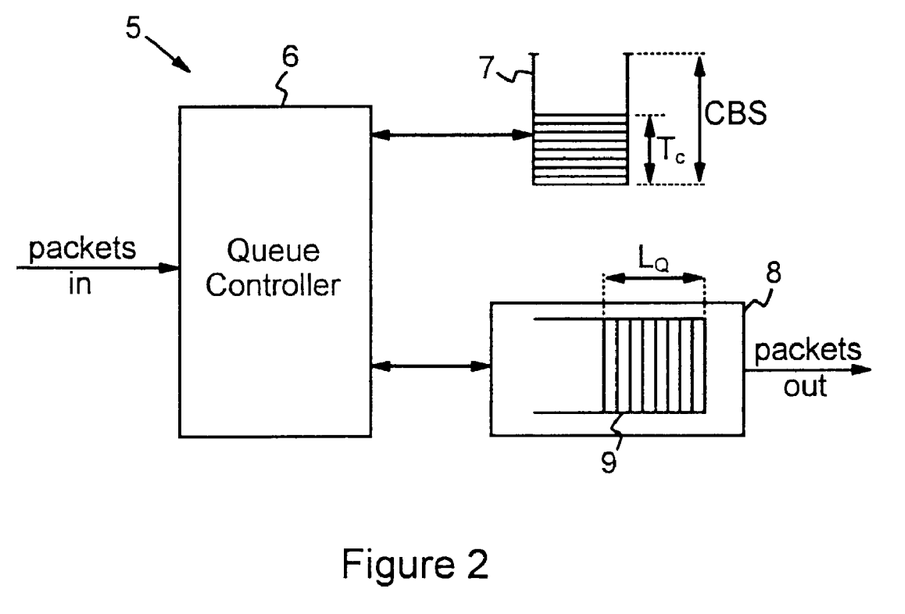
FIG. 2 is a schematic illustration of queue management apparatus embodying the invention.

FIG. 2 is a schematic representation of queue management apparatus showing the main elements of router 2 involved in operation of the system. The apparatus 5 comprises a queue controller device 6 which receives packets to be enqueued, and a token counter 7 which is maintained by queue controller 6 as described below. In this simple example, the resource to be protected is a buffer memory 8 which contains the queue 9 of data packets to be managed by the system. The token counter 7 is maintained by queue controller 6 for a particular flow of data packets processed by the system. While a single token counter 7 is shown here for simplicity, in general a number of different packet flows will share the same queue 9, and queue controller 6 then maintains a separate token counter 7 for each flow. For a given token counter 7, the token count $T_C$ is decremented by queue controller 6 when packets in the corresponding flow are transmitted to buffer 8 to be enqueued. In addition, the token count $T_C$ is continuously incremented by controller 6 up to a maximum upper limit CBS corresponding to the committed burst size. Specifically, the token count $T_C$ is incremented at a token increment rate C which is itself varied in dependence on bandwidth availability in buffer 8. The availability of bandwidth is indicated by a bandwidth indicator which is generated by controller 6 by comparing the queue occupancy (represented here by the queue length $L_Q$) with a threshold value "T".

The functionality of queue controller 6 is described in greater detail herein, and it will be understood from this description that controller 6 and token counter 7 may be implemented by suitably configured control logic, comprising hardware or software or a combination thereof, and may conveniently be implemented by a processor running software which configures the processor to perform the functions described. Suitable software will be apparent to those skilled in the art from the description herein. It is understood that while such a processor may be preconfigured with appropriate software, the program code constituting such software may be supplied separately for loading in the network device to configure the processor to operate as described. Such program code may be supplied as an independent element or as an element of the program code for a number of control functions, and may be supplied embodied in a computer-readable medium such as a diskette or an electronic transmission sent to a network operator.

Figure 3:
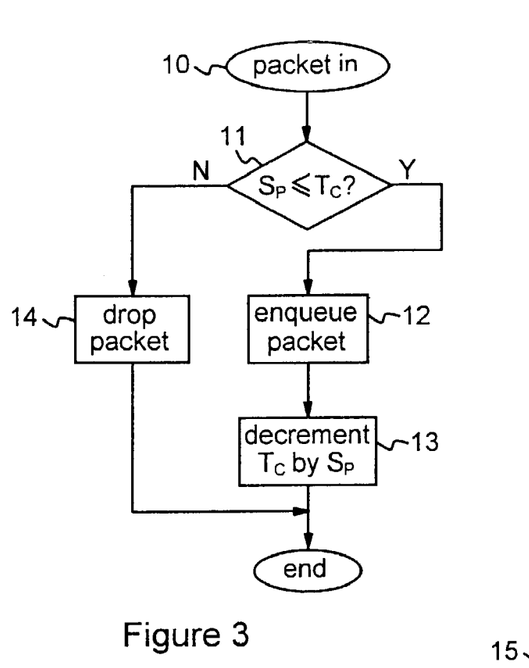
FIGS. 3 and 4 are flow charts illustrating processes performed in the apparatus of FIG. 2.

FIG. 3 is a flow chart illustrating the steps performed by queue controller 6 on arrival of a data packet to be enqueued. On receipt of a packet at step 10, the flow to which the packet belongs is identified in the usual way from information in the packet header. At step 11, a determination is made by the controller 6 as to whether the packet size $S_P$ (in tokens) is less than or equal to the current token count $T_C$ of the token counter 7 for the appropriate flow. Provided the packet size is no greater than the token count $T_C$ (i.e., "Yes" at step 11), then operation proceeds to step 12 where the packet is transmitted into the queue 9. Further, at step 13, the controller 6 decrements the token count $T_C$ by a number of tokens corresponding to the packet size, and the process is then complete. If, however, at step 12, the received packet size $S_P$ is greater than the token count $T_C$ (i.e., "No" at step 11), then in this example the packet is simply dropped at step 14. This packet is therefore not enqueued, and no decrement is made to the token count $T_C$.

Figure 4:
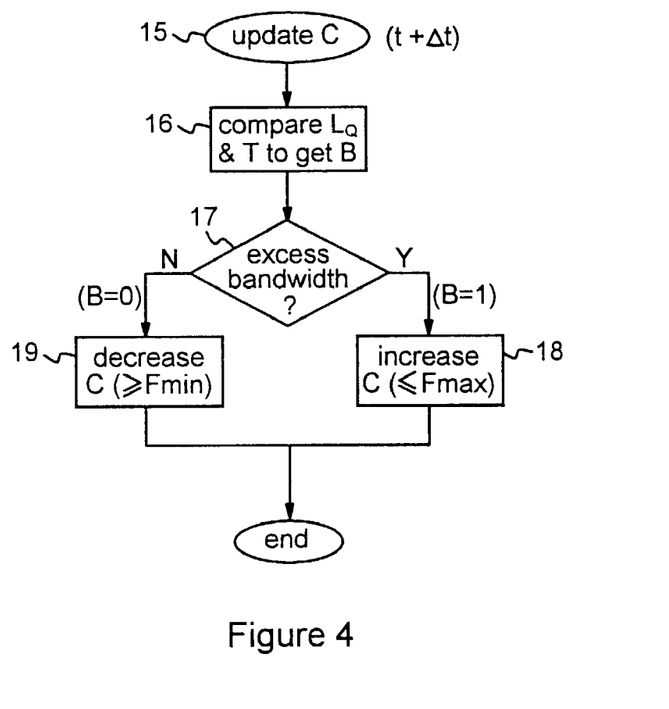

At commencement of operation, the token count $T_C$ is set to its maximum value CBS, and the count is progressively decremented as packets in the corresponding flow are transmitted into queue 9 as described above. When insufficient tokens are available to enqueue a packet, then the packet is simply discarded. However, the token count $T_C$ is continuously incremented by queue controller 6 at a token increment rate C. At the commencement of processing, the increment rate C is set to a minimum value Fmin for the flow, but the increment rate is periodically updated by controller 6 at successive time intervals $\Delta t$. That is, as now described with respect to FIG. 4, at periodic intervals $\Delta t$, i.e. at every time t+$\Delta t$, an update process begins as indicated by step 15 of FIG. 4. At step 16, the queue controller obtains the current queue length $L_Q$ (measured in any convenient data units) of queue 9 from buffer 8, and compares this value with a threshold value T to obtain a bandwidth indicator B. In particular, if $L_Q \leq T$ then B=1, and if $L_Q > T$ then B=0. The threshold T is set to define the transition between a state in which bandwidth is deemed to be available in buffer 8, i.e. there is excess bandwidth, and a state in which no bandwidth is available, i.e. there is no excess bandwidth. The indicator B thus serves as an excess bandwidth signal, B=1 signifying excess bandwidth and B=0 signifying no excess bandwidth. Thus, a determination is made at step 17 as to whether there is excess bandwidth. If there is excess bandwidth, i.e., B=1 ("Yes" at step 17), then operation proceeds to step 18 where the increment rate C (measured here in number of tokens per $\Delta t$) is increased by a linear (additive) increment, subject to a maximum limit Fmax on the increment rate. Specifically, the new value of C is related to the current value of C by:

newC=maximum{Fmin, minimum{Fmax, currentC+Fmax/$w_1$}} where $w_1$ is a predefined weighting factor. If, at step 17, it is determined that there is no excess bandwidth, i.e., B=0 at step 17, then operation proceeds to step 19 where the increment rate C is decreased by an exponential (multiplicative) factor, subject to the minimum increment rate of Fmin. Specifically, the new value of C here is related to the current value of C by:

newC=maximum{Fmin, minimum{Fmax, currentC*(1-1/$w_2$)}} where * represents multiplication and, $w_2$ is a predefined weighting factor. After increasing or decreasing the increment rate respectively, at step 18 or step 19, the update process is complete and the new increment rate will be applied by controller 6 to increment the token count $T_C$ for the next interval $\Delta t$.

In this embodiment, queue controller 6 updates the token count by one token at intervals of $\Delta t$/C so that the total count is incremented by C tokens in each $\Delta t$, subject to the maximum upper limit CBS on the token count. The update interval $\Delta t$ is synchronized for all flows here, but the parameters CBS, Fmin and Fmax, can be set on a per-flow basis. CBS represents the maximum burst size to be met for a given flow, and the limits Fmin and Fmax are determined by the guaranteed minimum and maximum rates offered to a user. Each of the weights $w_1$ and $w_2$ may be the same for all flows, these weights determining the convergence and fairness of the scheme. The weights may be set as desired for a given system, but reasonable convergence can achieved with $w_1$=16 and $w_2$=8. In any case, for the sake of reduced computation, $w_1$ and $w_2$ are ideally set to be powers of 2.

Figure 5:
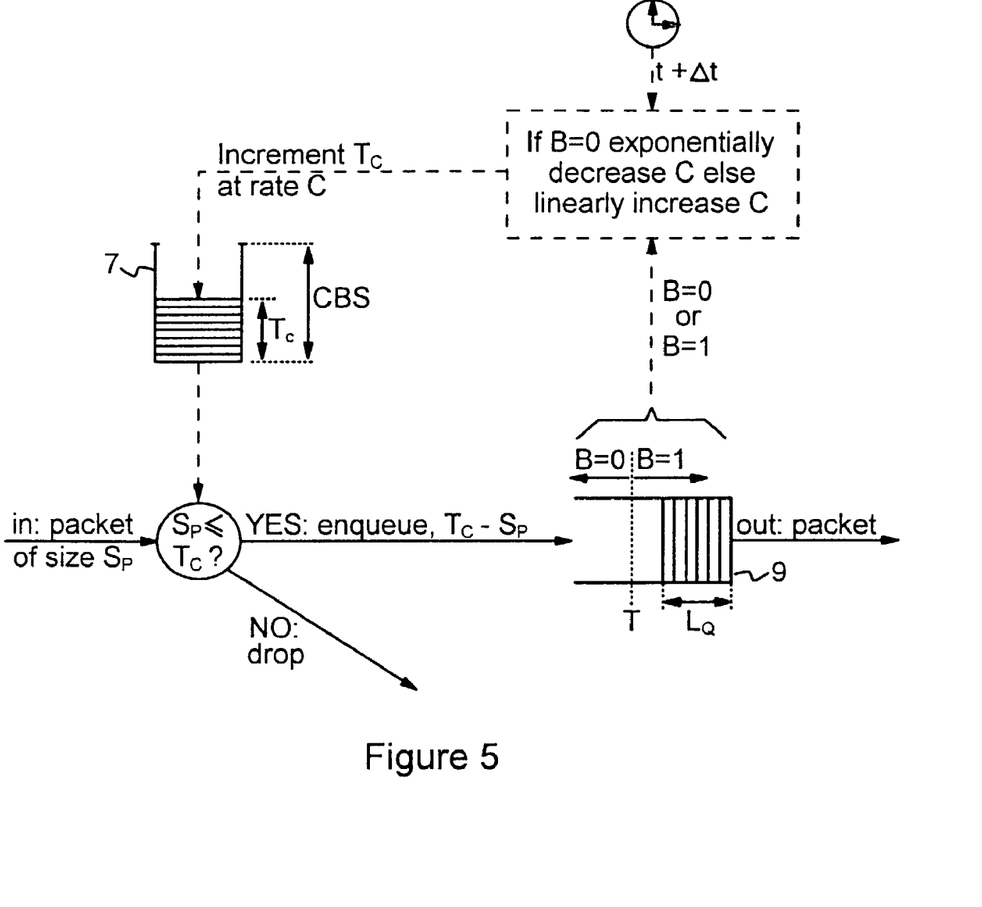
FIG. 5 is a schematic representation of the overall operation of the queue management apparatus described with respect to FIG. 2.

The overall operation of the queue management system is represented in the schematic of FIG. 5 which illustrates the bandwidth-dependent feedback mechanism more clearly. As shown in FIG. 5, the feedback mechanism varies the token increment rate C by additive increase/multiplicative decrease in dependence on the excess bandwidth indicator B monitored by queue controller 6. This provides a simple yet highly efficient system for local congestion control. The amount of state to be held for each flow is small—in the above embodiment only Fmin, Fmax, C and $T_C$ are required for each flow, with only C and $T_C$ being variable in operation. The simplicity and predictability of the system means that it is also easy to determine the appropriate system parameters in a given case. For example, the minimum and maximum bandwidth allocations for a flow correspond simply to Fmin/$\Delta t$ and Fmax/$\Delta t$, given in bits per second for each traffic flow. Moreover, the amount of computation per packet is low. The above embodiment simply requires the token count $T_C$ to be checked against the packet size $S_P$ and decremented as appropriate. In addition, the amount of periodic computation per $\Delta t$ is low. The excess bandwidth signal B is simply computed and the increment rate C updated accordingly. Furthermore the token counter is incremented according to the actual increment rate C and only decremented when traffic arrives. Compared to mechanisms with computationally costly updates even in the absence of traffic, this is of significant advantage with intermittent or low bandwidth flows.

Figure 6:
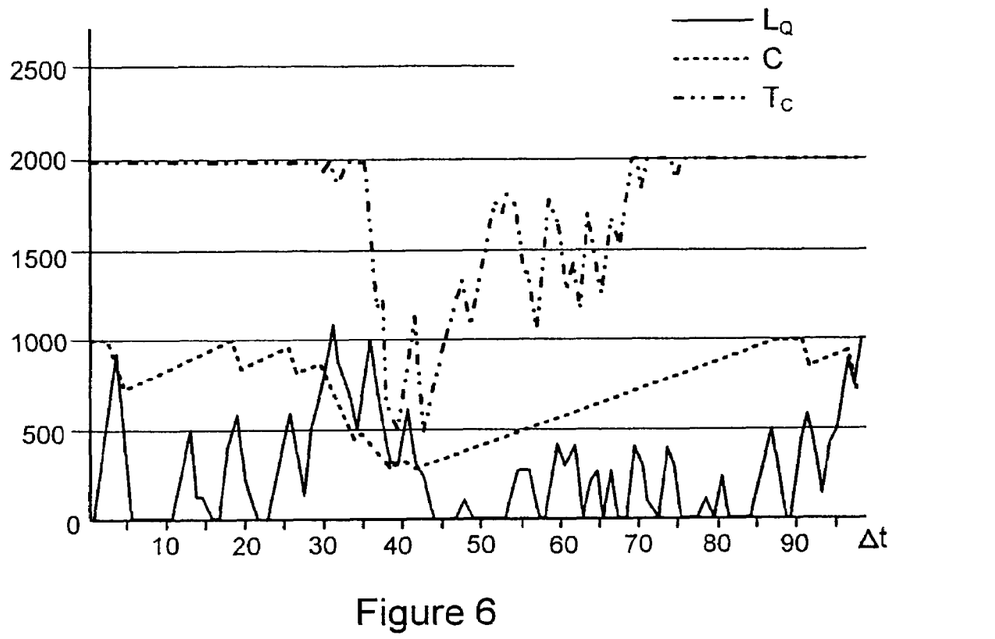
FIGS. 6 and 7 are graphs illustrating the operating dynamics of the queue management system of FIGS. 2 to 5.
Figure 7:
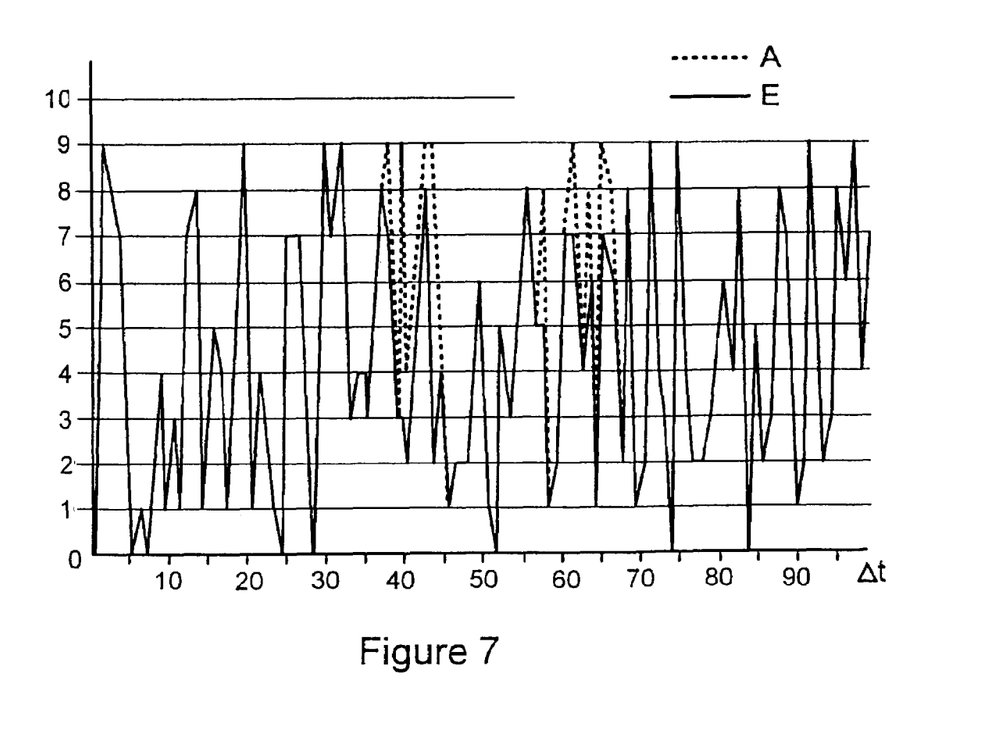

The graphs of FIGS. 6 and 7 illustrate the dynamics of the system for a single flow where the following values are used by way of example. The number of packets per $\Delta t$ is assumed to be a random integer in [0, 9], and the packet size is taken to be 100 bits. Packets are either transmitted into a queue, which is served at 500 bits per time step $\Delta t$, or discarded. The definition of excess bandwidth (B=1) is taken as queue length $L_Q \leq$ 500 bits. One token is taken to be one bit, and the limits on increment rate C are Fmin=0 and Fmax=1000 bits. The maximum burst size CBS is 2000 bits (=20 packets here), and the weights used are $w_1$=16 and $w_2$=8.

FIG. 6 is a graphic plot depicting queue length $L_Q$, token increment rate C and token count $T_C$ against time in steps of $\Delta t$ for the example provided. In the graph of FIG. 6, it is demonstrated that $L_Q$ starts at zero and then, due to heavy arrivals, increases at about time step 3 above the excess bandwidth threshold of 500 bits. This causes increment rate C to decrease from 1000 and later causes token count $T_C$ to decrease from 2000. By chance, relatively few packets arrive on average during time steps 70 to 95. The token count $T_C$ recovers quickly to the burst value 2000 and token increment rate C increases again towards its maximum value 1000. FIG. 7 plots the number of packets arriving A, and the number of packets transmitted E, during each interval $\Delta t$. It can be seen from FIG. 7 that during periods of light offered loads, all packets are transmitted, i.e. A=E.

The queue management system described herein may be employed in one or more devices in a given network. In FIG. 1 for example, the system is ideally employed in all of the core routers, and may also be employed in the edge routers of the network. Of course, while operation of the system has been described with reference to a router in this example, the system may be employed in other devices, such as switches, traffic shapers, and devices with firewalls for example, in which management of queues is required. Additionally, while operation has been described for a single queue, in general one or more queues, whether real or logical, may be managed by the system in a given device.

Figure 8:
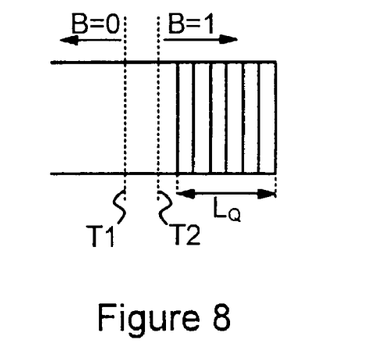
FIG. 8 is a diagram illustrating a modification to the bandwidth feedback operation in the FIG. 2 embodiment.

It is understood that other modifications may be made to the specific system of the present invention. For example, rather than dropping packets when insufficient tokens are available, in other embodiments packets may be marked to be dropped as mentioned earlier. Here, a marker can be set in the packet when insufficient tokens are available, the packet then being enqueued without decrementing the token count, so that marked packets can be preferentially dropped at a later stage if necessary based on congestion levels. As another example, while queue occupancy is represented by current queue length $L_Q$ in the above system, in other embodiments an average queue length could be employed if desired. Further, while a simple two-state indicator B is used in the above embodiment for switching between increasing or decreasing increment rates, the increment rate variation could be smoothed across the bandwidth availability threshold in other embodiments. In one particular preferred embodiment, hysteresis may be incorporated in the process for generating the bandwidth indicator B. This is illustrated schematically in FIG. 8 which depicts the use of two queue occupancy thresholds: an upper threshold T1 and a lower threshold T2. The upper threshold T1 defines the transition between a state in which bandwidth is available (B=1) and a state in which bandwidth is not available (B=0) as queue occupancy increases, and the lower threshold T2 defines the transition between the B=0 state and the B=1 state as queue occupancy decreases. Thus, as $L_Q$ increases from zero, B=1 until $L_Q$ exceeds T1 whereupon the state changes to the B=0. As $L_Q$ then changes, the B=0 state persists until $L_Q$ drops to the threshold T2, whereupon the state changes back to B=1. The indicator B thus remains in its previous state for queue lengths between the two thresholds, and this prevents the bandwidth indicator from switching repeatedly back and forward between its two states if the queue length oscillates about a single threshold level. Many other changes and variations may be made to the foregoing embodiments within the spirit and scope of the present invention.

We claim:

1. A method for managing a data packet queue corresponding to a resource of a network device, the method comprising the steps of:
   a) maintaining a token count for a predefined flow of data packets;
   b) controlling transmission of packets in said flow into the queue in dependence on the token count;
   c) decrementing the token count when packets in the flow are transmitted into the queue;
   d) incrementing the token count at a token increment rate;
   e) monitoring a bandwidth indicator indicative of bandwidth availability in the data packet queue; and
   f) varying the token increment rate in dependence on the bandwidth indicator such that the increment rate is increased when available bandwidth is indicated and decreased when no available bandwidth is indicated.

2. The method according to claim 1 wherein the token increment rate is varied at periodic time intervals in dependence on the bandwidth indicator.

3. The method according to claim 2 wherein the token increment rate is varied between predefined minimum and maximum values for said flow.

4. The method according to claim 2 wherein the token increment rate is increased linearly at successive said intervals while available bandwidth is indicated, and decreased multiplicatively at successive said intervals while no available bandwidth is indicated.

5. The method according to claim 2 wherein the bandwidth indicator is dependent on occupancy of the queue.

6. The method according to claim 5 further including a step of: generating the bandwidth indicator by comparing the queue occupancy with a threshold representing the transition between a state in which bandwidth is available and a state in which no bandwidth is available.

7. The method according to claim 5 further including the steps of: generating a bandwidth indicator by comparing the queue occupancy with an upper threshold, said upper threshold representing a transition between a state in which bandwidth is available and a state in which no bandwidth is available as queue occupancy increases, and a lower threshold representing a transition between a state in which no bandwidth is available and a state in which bandwidth is available as queue occupancy decreases.

8. The method according to claim 1 further including the step of receiving a packet in a flow, and upon receipt of said flow packet, the step of:
   comparing the token count with the packet size, and,
   transmitting the packet into the queue if the packet size is not greater than the token count.

9. The method according to claim 8 further including the step of determining whether a packet has been transmitted into the queue, and if determined that said packet is transmitted into the queue, the step of decrementing the token count by a number of tokens which corresponds to the packet size.

10. A system for managing a data packet queue corresponding to a resource of a network device, the system comprising:
   a token counter corresponding to a predefined flow of data packets;
   a control means implementing logic for maintaining a token count and controlling transmission of packets in said flow into the packet queue in dependence on said token count; said control means further decrementing the token count when packets in the flow are transmitted into the queue, or incrementing the token count at a token increment rate; and,
   means for monitoring a bandwidth availability in the data packet queue and generating a bandwidth indicator indicative of bandwidth,
   wherein said control means for varying the token increment rate according to said bandwidth indicator, the increment rate being increased when available bandwidth is indicated and decreased when no available bandwidth is indicated.

11. A network device for processing data packets in a communications network, the device comprising a resource which is associated with a queue of data packets, said network device further comprising:
   an associated token counter corresponding to a predefined flow of data packets processed by the device; and
   a control means implementing logic for maintaining a token count and controlling transmission of packets in said flow into the packet queue in dependence on said token count; said control means further decrementing the token count when packets in the flow are transmitted into the queue, or incrementing the token count at a token increment rate; and,
   means for monitoring a bandwidth availability in the data packet queue and generating a bandwidth indicator indicative of bandwidth, wherein said control means for varying the token increment rate according to said bandwidth indicator, the increment rate being increased when available bandwidth is indicated and decreased when no available bandwidth is indicated.

12. A data communications network comprising a plurality of network devices, at least one of the network devices including a resource which is associated with a queue of data packets, said network device further comprising:

an associated token counter corresponding to a predefined flow of data packets processed by the device; and a control means implementing logic for maintaining a token count and controlling transmission of packets in said flow into the packet queue in dependence on said token count; said control means further decrementing the token count when packets in the flow are transmitted into the queue, or incrementing the token count at a token increment rate; and, means for monitoring a bandwidth availability in the data packet queue and generating a bandwidth indicator indicative of bandwidth, wherein said control means for varying the token increment rate according to said bandwidth indicator, the increment rate being increased when available bandwidth is indicated and decreased when no available bandwidth is indicated.

13. A computer program product comprising a computer usable medium having embodied therein computer readable program code means for causing a processor of a network device, having a resource which is associated with a queue of data packets, to perform a queue management method comprising the steps of:

a) maintaining a token count for a predefined flow of data packets;

b) controlling transmission of packets in said flow into the queue in dependence on the token count;

c) decrementing the token count when packets in the flow are transmitted into the queue;

d) incrementing the token count at a token increment rate;

e) monitoring a bandwidth indicator indicative of bandwidth availability in the data packet queue; and f) varying the token increment rate in dependence on the bandwidth indicator such that the increment rate is increased when available bandwidth is indicated and decreased when no available bandwidth is indicated.

14. The computer program product according to claim 13 wherein the token increment rate is varied at periodic time intervals in dependence on the bandwidth indicator.

15. The computer program product according to claim 14 wherein the token increment rate is varied between predefined minimum and maximum values for said flow.

16. The computer program product according to claim 14 wherein the token increment rate is increased linearly at successive said intervals while available bandwidth is indicated, and decreased multiplicatively at successive said intervals while no available bandwidth is indicated.

17. The computer program product according to claim 13 wherein the bandwidth indicator is dependent on occupancy of the queue.

18. The computer program product according to claim 17 further including a step of: generating the bandwidth indicator by comparing the queue occupancy with a threshold representing the transition between a state in which bandwidth is available and a state in which no bandwidth is available.

* * * * *